UNITED STATES PATENT OFFICE.

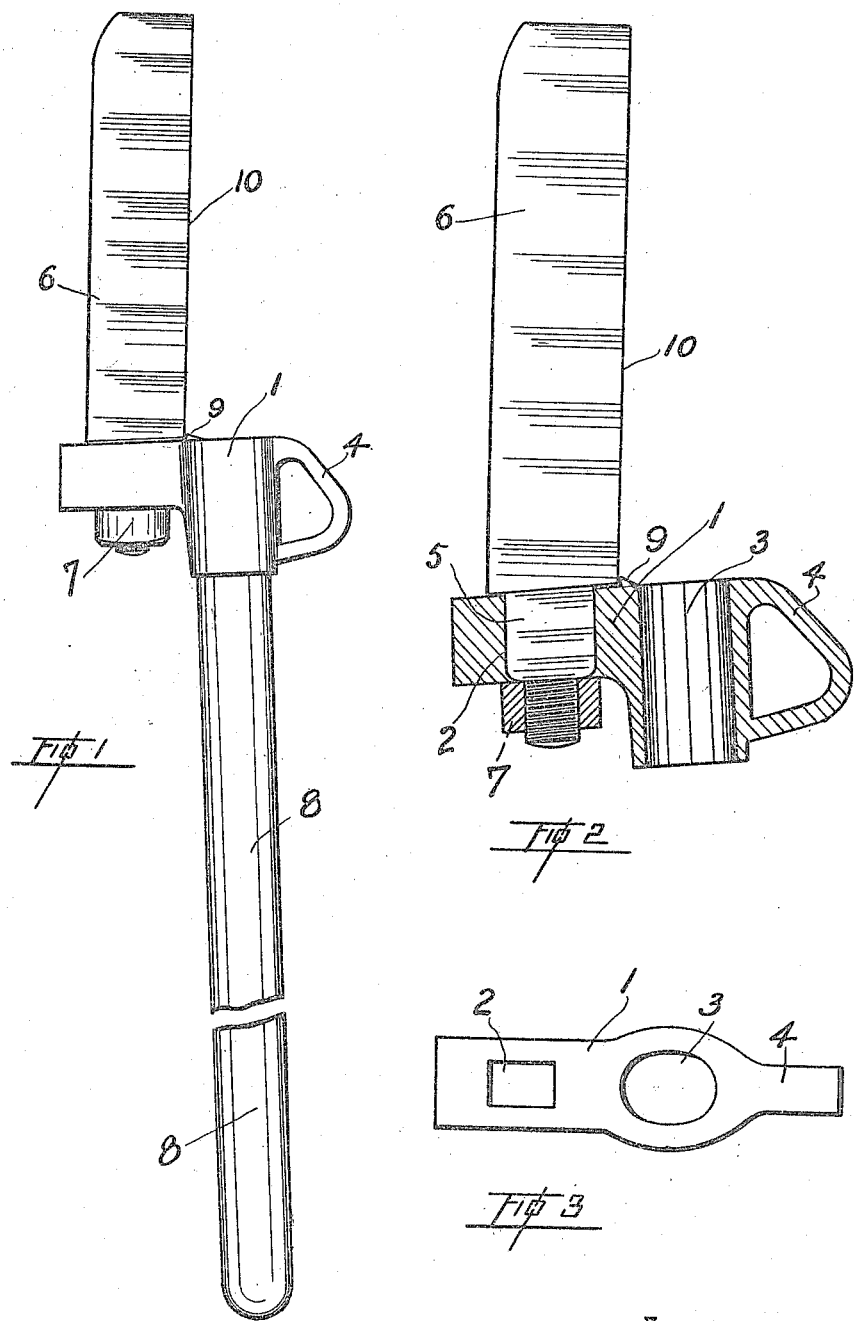

GEORGE A. CAMERON AND JAMES McKAY, OF STEWART, BRITISH COLUMBIA, CANADA.

BRUSH-CUTTING KNIFE.

1,270,492.  Specification of Letters Patent.  Patented June 25, 1918.

Application filed December 4, 1917. Serial No. 205,406.

*To all whom it may concern:*

Be it known that we, GEORGE A. CAMERON and JAMES MCKAY, both subjects of the King of Great Britain, and both residents of Stewart, in the Province of British Columbia, Canada, have invented certain new and useful Improvements in Brush-Cutting Knives, of which the following is a specification.

Our invention relates to improvements in knives used for the cutting of brush and the like, and the object of our invention is to devise a knife so balanced that the cutting edge of the blade is always maintained in line with the direction of the force exerted on the handle, thus eliminating the rolling or turning effect common to such knives when coming in contact with the brush when cutting the same and making possible the use of a much thinner edged blade than is found in brush cutting knives in present use.

We attain this object by the construction illustrated in the accompanying drawings in which—

Figure 1 is a view of the knife in side elevation.

Fig. 2 is an enlarged partial view in cross section, showing the connection of the blade and handle.

Fig. 3 is an end view of the blade and handle sockets.

Similar figures of reference indicate similar parts throughout the several views.

1 indicates a socket member, formed of any suitable material and preferably of the shape shown in the drawings, which member is provided with a knife blade receiving aperture 2, a handle receiving aperture 3, and a guard member 4, the purpose of which member 4 is to act as a guard for throwing small branches on to the blade and also for relieving the jar on the handle in the event of overreaching when using the heel of the blade near the socket when cutting large branches, the guard in that case slipping off the limb or branch. The aperture 2 is substantially rectangular in formation and is adapted to receive a correspondingly shaped end 5 formed on the knife blade 6, the extremity of which end 5 is extended and threaded to receive a nut 7 by means of which the blade 6 may be secured rigidly to the member 1 when the end 5 is fitted into the aperture 2, as shown in Fig. 2, the sharp edge 10 of the blade then facing inwardly. The knife blade is preferably about six and one-half inches in length.

The aperture 3 is substantially oval shape and is adapted to receive a handle 8 similar to those used for hammer handles, which handle is of a length sufficient to afford sufficient grip for both hands of the operator, being preferably about thirty-three inches long.

9 indicates a small guard positioned in front of the sharp edge of the blade to cover the joint between the blade shoulder and the socket member and formed integrally with the socket, the purpose of this guard being to prevent the accumulation of twigs or grass between the blade shoulder and the socket.

From the foregoing description and the drawings the relative arrangement of the blade 6 and handle 8 with respect to each other will be apparent, as it will be seen that the blade axis is situated to the rear of the handle axis and that the handle axis is inclined forwardly with relation to the blade axis, the socket member 1 being mounted on the handle at right angles to the axis thereof, all as shown in Fig. 1. Such an arrangement balances the knife so that it will not roll or turn when cutting and enables a thin edged blade to be used, thereby providing a highly efficient and satisfactory brush cutting knife.

What we claim as our invention is:—

A brush cutting knife comprising, a cutting blade, a gripping handle, a socket member having apertures in which the blade and the handle are respectively secured, said apertures being arranged so that the blade axis is to the rear of the handle axis, an inclined guard member projecting from the end of the socket, and a guard member on the upper face of the socket adjacent to and disposed to cover the joint between the blade shoulder and the socket member.

Dated at Stewart, B. C., this 15th day of October, 1917.

GEORGE A. CAMERON.
JAMES McKAY.

Copies of this patent may be obtained for five cents each, by addressing the "Commissioner of Patents, Washington, D. C."